(12) United States Patent
Takahashi

(10) Patent No.: US 8,116,565 B2
(45) Date of Patent: Feb. 14, 2012

(54) COLLATION DEVICE AND COLLATION METHOD FOR AUTHENTICATING USERS

(75) Inventor: Nobuo Takahashi, Kawasaki (JP)

(73) Assignee: NEC Infrontia Corporation, Kawasaki (JP)

( * ) Notice: Subject to any disclaimer, the term of this patent is extended or adjusted under 35 U.S.C. 154(b) by 1382 days.

(21) Appl. No.: 11/270,519

(22) Filed: Nov. 10, 2005

(65) Prior Publication Data

US 2006/0098847 A1    May 11, 2006

(30) Foreign Application Priority Data

Nov. 11, 2004  (JP) ................. 2004-327610

(51) Int. Cl.
*G06K 9/00* (2006.01)
(52) U.S. Cl. ........................................ 382/181
(58) Field of Classification Search .............. None
See application file for complete search history.

(56) References Cited

U.S. PATENT DOCUMENTS

| | | | |
|---|---|---|---|
| 5,140,683 A * | 8/1992 | Gallo et al. | 711/117 |
| 5,697,376 A * | 12/1997 | Nomura et al. | 600/300 |
| 6,325,285 B1 | 12/2001 | Baratelli | |
| 6,643,656 B2 | 11/2003 | Peterson | |
| 6,655,585 B2 | 12/2003 | Shinn | |
| 6,747,564 B1 | 6/2004 | Mimura et al. | |
| 2002/0024312 A1* | 2/2002 | Takagi | 318/568.12 |
| 2002/0138767 A1 | 9/2002 | Hamid et al. | |
| 2003/0028814 A1 | 2/2003 | Carta et al. | |
| 2004/0234111 A1* | 11/2004 | Mueller | 382/124 |

FOREIGN PATENT DOCUMENTS

| | | |
|---|---|---|
| CN | 1173234 A | 2/1998 |
| EP | 1146487 A2 | 10/2001 |
| JP | 01-209584 | 8/1989 |
| JP | 06-012331 A | 1/1994 |
| JP | 2000-181801 A | 6/2000 |
| JP | 2003-346099 A | 12/2003 |
| TW | 527568 | 7/1987 |
| TW | 428755 | 6/1988 |
| WO | WO 96/18168 A1 | 6/1996 |

OTHER PUBLICATIONS

Japanese Office Action dated Jul. 21, 2010 with partial English Translation.

* cited by examiner

*Primary Examiner* — Daniel Mariam
*Assistant Examiner* — Elisa Rice
(74) *Attorney, Agent, or Firm* — Sughrue Mion PLLC

(57) ABSTRACT

A reading unit supplies card information that has been read from a card to a management unit by way of a read-out unit. The management unit assigns a high order of priority to card information that has been newly read and stores the card information to which this order of priority has been given in a memory unit. A fingerprint scanner supplies input fingerprint information to a selection unit by way of a generation unit. The selection unit, upon receiving the input fingerprint information, supplies this input fingerprint information to a collation unit and further, selects a plurality of items of registered fingerprint information that are stored in the memory unit starting in order with items having the highest order of priority. The collation unit, upon receiving the input fingerprint information, collates this input fingerprint information with the registered fingerprint information in the order selected by the selection unit, and determines whether registered fingerprint information that matches the input fingerprint information is present within the plurality of items of registered fingerprint information.

16 Claims, 11 Drawing Sheets

COLLATION DEVICE AND COLLATION METHOD FOR AUTHENTICATING USERS

BACKGROUND OF THE INVENTION

1. Field of the Invention

The present invention relates to a collation device and a collation method.

2. Description of the Related Art

Systems, which are provided with card reader devices and host devices, are known in the prior art. The host device is a control device such as a server. The card reader device reads specific information such as an ID number from a card in which this specific information has been recorded. The card reader device then reports the card specific information (hereinbelow referred to as "specific information") that has been read to the host device by way of a communication network.

A card reader device that includes a fingerprint collation device is also known. More specifically, the fingerprint collation device reads the fingerprint information from a card in which the fingerprint information of the true owner of this card has been recorded. The fingerprint collation device collates the fingerprint information that has been read and stored in it with the fingerprint that is read from the finger of the user of the card in order to verify whether the user of the card is the true owner of the card.

A card reader device that includes a fingerprint collation device is hereinbelow referred to a "card reader device with fingerprint collation capability." A card reader device with fingerprint collation capability has the following important advantages:

The fingerprint collation device has excellent compatibility with systems that use cards. In addition, an individual can be authenticated without divulging his or her fingerprint information, which is personal information, to the communication network. Further, recording fingerprints on cards enables a reduction of the burden of installing, operating, and managing a center that includes a fingerprint collation database for storing fingerprint information for authentication.

Nevertheless, each time the user uses a card reader device with fingerprint collation capability, the user must carry out both the task of having the fingerprint information that is recorded on a card read into the card reader device with fingerprint collation capability, and the task of having his or her own fingerprint read into the card reader device with fingerprint collation capability, and the time, which is required for a user in order to operate the card reader device, therefore increases.

More specifically, each time the user uses the card reader device with fingerprint collation capability, the user must insert a card into the card reader device with fingerprint collation capability. In addition, the user must wait until the card reader device with fingerprint collation capability has read all of the fingerprint information and until his or her own specific information from the card that has been insert into the card reader device.

The operation of inserting a card is more troublesome than a case in which such an operation is not necessary. In addition, when the method for reading information from a card is complex or the volume of information is great, the operation of reading the information from the card may be extremely time-consuming.

For these reasons, when a plurality of users operate the card reader device with fingerprint collation capability by turns at frequent intervals, each user is unable to promptly operate the card reader device with fingerprint collation capability, and the operation efficiency of the device is therefore degraded.

For example, when a specific plurality of users operate a single card reader device with fingerprint collation capability in a store or an office by turns at frequent intervals in order to get work done more quickly, the amount of time required for card operation degrades work efficiency.

Many techniques have been proposed for using fingerprint collation in order to verify whether the user of a card is the true owner of that card. However, most of these techniques have been proposed on the assumption that the card reader device with fingerprint collation capability will be used by a nonspecific number of users at a low level of frequency, such as would be the case for a credit card or an ATM cash card, and as a result, provisions for speeding up operations were not required.

JP-A-2003-346099 discloses a card reader device with fingerprint collation capability that is capable of shortening the time required for the card operation.

More specifically, this card reader device with fingerprint collation capability first reads fingerprint information and an ID number that have been recorded on an ID card. This card reader device with fingerprint collation capability stores the fingerprint information and ID number that have been read in association with each other in a memory. The card reader device with fingerprint collation capability then, after acquiring the ID number from the ID card or ten-key pad, reads the fingerprint information that is associated with the acquired ID number from memory. The card reader device with fingerprint collation capability then collates the fingerprint information that has been read with the fingerprint of the user of the ID card.

By means of this card reader device with fingerprint collation capability, the ID number and fingerprint information, which have been recorded on an ID card, are stored in memory. The fingerprint of the user of an ID card is collated with fingerprint information that has been stored in memory. Accordingly, once fingerprint information is stored in memory, the user of an ID card can undergo fingerprint collation by using an ID number and his or her fingerprint without using the ID card.

However, this card reader device with fingerprint collation capability still requires the user of a card to perform the tasks of storing fingerprint information in memory, using as input an ID number for specifying the fingerprint information that is stored in memory, and having the device read his or her fingerprint. As a result, the problem remains that a great deal of time is required for collation.

This problem is not limited to a fingerprint collation device and also occurs in the following collation device:

A collation device first stores registration identification information and an ID number that are associated with each other and that are recorded on a portable recording medium such as a card in memory. This collation device then acquires the ID number from the user. The collation device then collates the registration identification information, which is associated with the acquired ID number, with input identification information that has been acquired from the user.

SUMMARY OF THE INVENTION

It is an object of the present invention to provide a collation device and collation method that can shorten the time required for collation.

To achieve the above-described object, the collation device according to the present invention includes a reading unit, a storage unit, an acquisition unit, and a collation/determination unit.

The reading unit reads the registered identification information that is recorded on a portable recording medium.

Each time the reading unit reads the registered identification information, the storage unit successively stores the registered identification information that has been read.

The acquisition unit acquires input identification information from the user.

When the acquisition unit acquires the input identification information, the collation/determination unit collates the input identification information that has been acquired with the plurality of items of registered identification information that have been stored in the storage unit, and determines whether any registered identification information, matching the input identification information, is present among the plurality of items of registered identification information.

According to the above-described invention, each time registered identification information is read from a portable recording medium, the registered identification information that has been read is successively stored in a storage unit. When input identification information is acquired from a user, this input identification information is collated with a plurality of items of registered identification information that has been stored in the storage unit, and it is determined whether any registered identification information, matching the input identification information, is present among the plurality of items of registered identification information.

Thus, if registered identification information is stored in the storage unit, the existence of any registered identification information, which matches input identification information among a plurality of items of registered identification information, is determined even if the user does not use a portable recording medium, and moreover, even if the user does not perform an operation specifying the registered identification information that has been stored in the storage unit.

Accordingly, the time that is required for collation can be shortened in a collation device that collates registered identification information, which has been recorded on a portable recording medium such as a card, with input identification information that has been acquired from the user. In addition, the collation device according to the present invention is preferably a collation device such as described below:

The reading unit reads specific information and registered identification information that have been recorded on the portable recording medium.

Each time the reading unit reads the specific information and the registered identification information, the storage unit successively stores the specific information and the registered identification information, which have been read, in association with each other.

When registered identification information, which matches the input identification information, is present among the plurality of items of registered identification information, the collation/determination unit supplies the specific information that has been stored in the storage unit in association with the registered identification information.

According to the above-described invention, the time that is required for collation is shortened, and the specific information can be supplied in a short time.

In addition, the collation device according to the present invention is preferably a collation device as described below:

A storage management unit is further included, and the collation/determination unit includes a selection unit and a collation unit.

The storage management unit gives an order of priority to the registered identification information that the reading unit has read. The storage management unit successively stores registered identification information having this order of priority in the storage unit.

When the acquisition unit acquires input identification information, the selection unit selects a plurality of items of registered identification information, which have been stored in the storage unit, in order starting from the highest order of priority.

The collation unit collates the input identification information with the registered identification information in the order selected by the selection unit, and determines whether any registered identification information matching the input identification information is present among the plurality of items of registered identification information.

According to the above-described invention, registered identification information is collated with the input identification information in accordance with its order of priority. As a result, appropriate setting of the order of priority allows rapid determination of the existence of registered identification information that matches the input identification information.

The highest priority is preferably given to registered identification information that has been newly read.

According to the above-described invention, the highest priority can be given to registered identification information that is highly likely to be used in collation. As a result, determination of the existence of registered identification information, which matches input identification information, can be carried out rapidly.

In addition, when it has been determined that any registered identification information, matching the input identification information, is present among the plurality of items of registered identification information, the order of priority of the registered identification information is preferably determined in accordance with the times that this registered identification information matches the input identification information.

According to the above-described invention, registered identification information having a high frequency of use can be assigned a higher order of priority. As a result, the determination of the existence of registered identification information, matching the input identification information, can be carried out rapidly.

The collation device according to the present invention is preferably a collation device as described below:

When the reading unit newly reads registered identification information and the storage unit lacks capacity for storing the registered identification information that has been read, the storage management unit deletes registered identification information having the lowest order of priority from the storage unit. The storage management unit then stores the newest registered identification information that has just been read in the storage unit.

According to the above-described invention, registered identification information having a high order of priority remains in the storage unit. As a result, the limited capacity of a storage unit can be effectively used.

In addition, the portable recording medium is preferably a card-type.

The storage unit is preferably volatile memory.

According to the above-described invention, registered identification information that has been stored in volatile memory is eliminated when the power supply of the volatile memory is cut off. As a result, the possibility of divulging registered identification information can be reduced.

In addition, volatile memory is preferably RAM.

In addition, registered identification information is preferably registered fingerprint information, and input identification information is preferably input fingerprint information.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
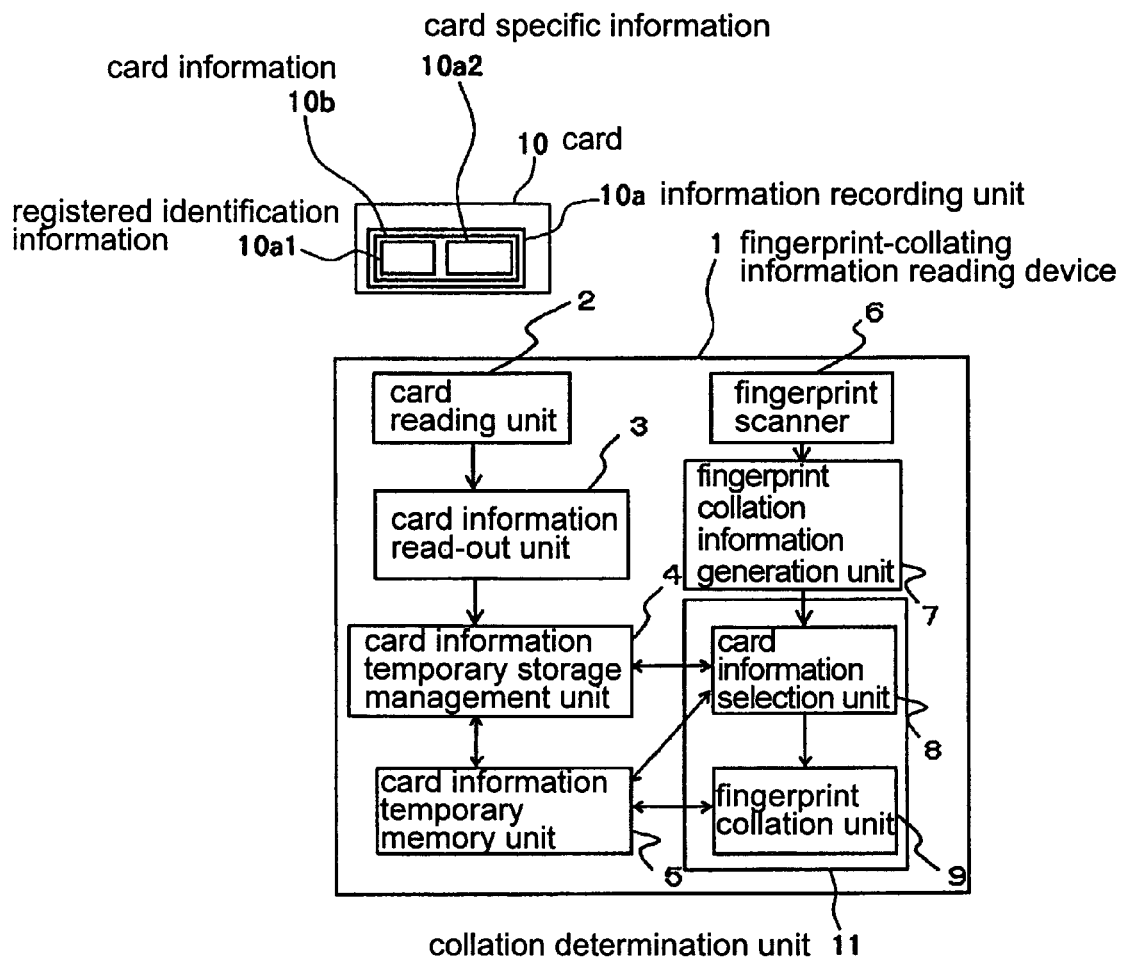
FIG. 1 is a block diagram showing a fingerprint-collating information-reading device according to a example of the present invention.

FIG. 1 is a block diagram showing a collation device, and more specifically, a fingerprint-collating information-reading device according to an example of the present invention. In the following explanation, the fingerprint-collating information-reading device is referred to as a "reading device."

In FIG. 1, reading device 1 includes at least: card reading unit 2, card information read-out unit 3, card information temporary storage management unit 4, card information temporary memory unit 5, fingerprint scanner 6, fingerprint collation information generation unit 7, card information selection unit 8, and fingerprint collation unit 9.

Reading device 1 may have an independent case, or may be incorporated as a part of a still larger device.

Card-type recording medium 10 is one example of a portable recording medium. In the following explanation, the card-type recording medium is referred to as a "card." Card 10 includes information recording unit 10a. Card information 10b is recorded in information recording unit 10a.

Card information 10b includes registered identification information 10a1 and specific information 10a2. In addition, encrypted registered identification information 10a1 and encrypted specific information 10a2 are preferably recorded in information recording unit 10a.

Registered identification information 10a1 is identification information for identifying the true owner of card 10. In the present embodiment, the fingerprint information of the true owner of card 10 is used as registered identification information 10a1. In the following explanation, the fingerprint information of the true owner of card 10 is referred to as "registered fingerprint information 10a1."

Specific information 10a2 is specific information of card 10. In the present embodiment, card number 10a21 and individual information (for example, an ID number) 10a22 are used as specific information 10a2.

Figure 2:
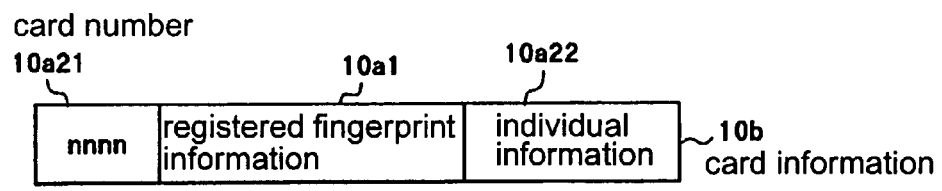
FIG. 2 is an explanatory view showing an example of card information.

FIG. 2 is an explanatory view showing an example of card information 10b.

In FIG. 2, card information 10b includes registered fingerprint information 10a1, card number 10a21, and individual information 10a22.

Registered fingerprint information 10a1 is linked with card number 10a21 and individual information 10a22.

Card 10 is, for example, a magnetic card, a contact IC card, or a contactless IC card. In addition, the recording method of recording card 10 may be a method that allows recording registered identification information 10a1 and specific information 10a2, and no limitations are placed on this method.

In the present embodiment, card 10 is used as an example of a portable recording medium. However, the portable recording medium may be a form that the user can always carry and that is separate from reading unit 1. As a result, the portable recording medium need not be in the form of a card.

Card reading unit (hereinbelow referred to as "reading unit") 2 is interface hardware that accords with the type (recording method) of card 10. Reading unit 2 reads card information 10b that is recorded on card 10. Reading unit 2 may also be provided with a card writing capability.

Card information read-out unit (hereinbelow referred to as "read-out unit") 3 controls reading unit 2 and reads card information 10b from card 10.

When card information 10b has been encrypted, read-out unit 3 decrypts card information 10b that has been encrypted.

Read-out unit 3 may also verify whether specific authentication information has been recorded on card 10 in order to authenticate card 10.

Card information temporary storage management unit (hereinbelow referred to as "management unit") 4 stores card information 10b that has been read by reading unit 2 in card information temporary memory unit (hereinbelow referred to as "memory unit") 5.

For example, each time read-out unit 3 reads registered fingerprint information 10a1 by way of reading unit 2, management unit 4 successively stores registered fingerprint information 10a1 that has been read to memory unit 5.

More specifically, each time read-out unit 3 reads registered fingerprint information 10a1 and specific information 10a2 by way of reading unit 2, management unit 4 successively stores registered fingerprint information 10a1 and specific information 10a2 that are associated with each other and that have been read in memory unit 5.

Management unit 4 further assigns an order of priority to registered fingerprint information 10a1 (card information 10b) that has been read by read-out unit 3 by way of reading unit 2. Management unit 4 successively stores in memory unit 5 registered fingerprint information 10a1 (card information 10b) that has an order of priority.

For example, management unit 4 gives the highest priority to registered fingerprint information 10a1 (card information 10b) that read-out unit 3 has newly read by way of reading unit 2.

When fingerprint collation unit 9 determines that registered fingerprint information 10a1, which matches input fingerprint information that has been acquired by fingerprint scanner 6, is present among the plurality of items of registered fingerprint information 10a1 that have been stored in memory unit 5, management unit 4 determines the order of priority of registered fingerprint information 10a1 in accordance with the times that registered fingerprint information 10a1 matches the input fingerprint information. More specifically, management unit 4 determines the order of priority of card information 10b, which contains this registered fingerprint information 10a1, in accordance with the number of these determinations.

In addition, if a vacant area (vacant capacity) is present in memory unit 5, management unit 4 stores new card information 10b in this vacant area. If no vacant area is present in memory unit 5, management unit 4 deletes card information 10b that has the lowest order of priority among card information 10b that is stored in memory unit 5, and then stores new card information 10b in place of card information 10b that has been deleted in memory unit 5.

Figure 3:
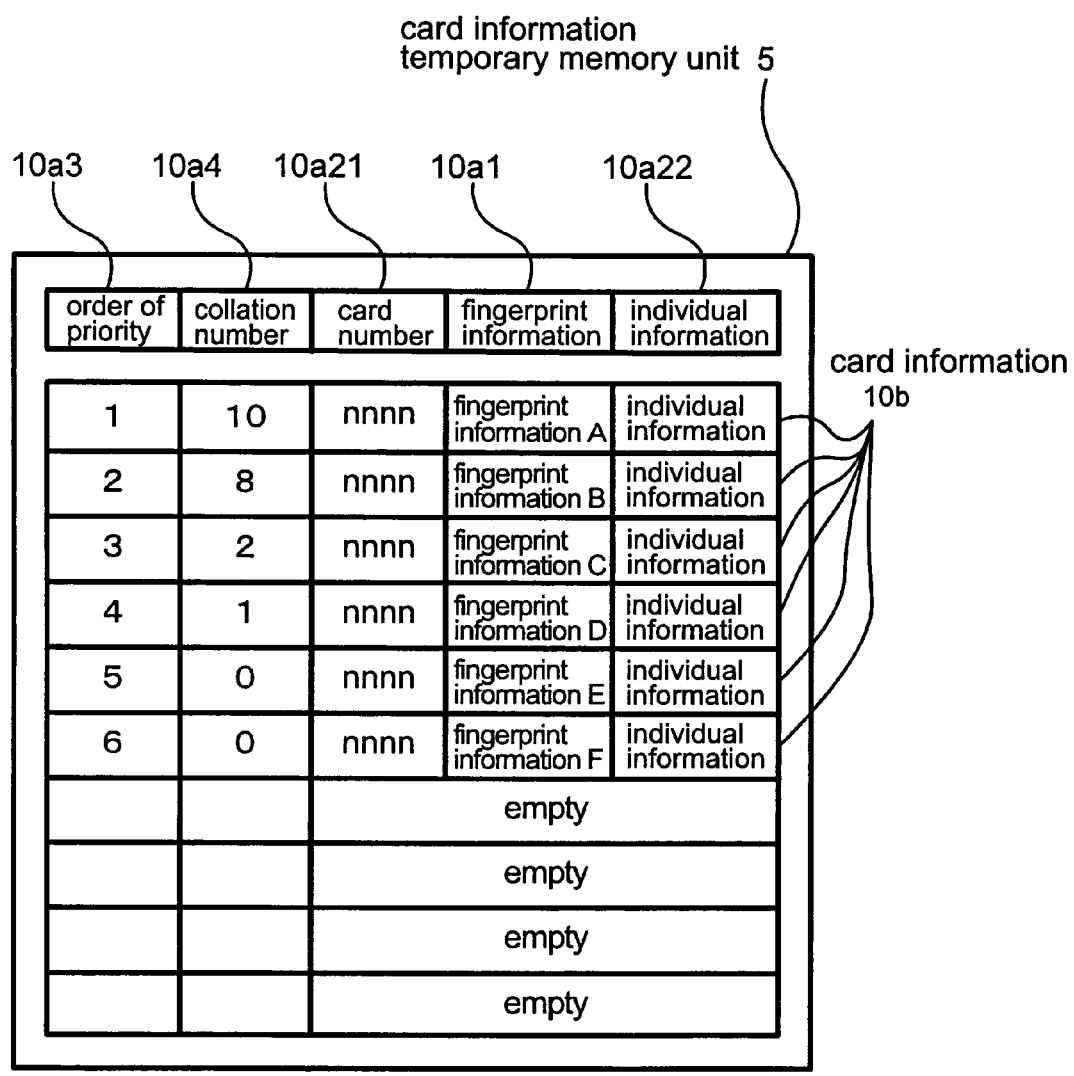
FIG. 3 is an explanatory view showing an example of memory unit 5.

FIG. 3 is an explanatory view showing an example of memory unit 5, and parts that are identical to parts shown in FIG. 2 are given the same reference numerals in FIG. 3.

In FIG. 3, memory unit 5 stores a plurality of items of card information 10b. Each item of card information 10b has registered fingerprint information 10a1, card number 10a21, individual information 10a22, order of priority 10a3, and collation number 10a4 that are associated with each other.

Memory unit 5 is volatile or nonvolatile memory. Each time read-out unit 3 reads registered fingerprint information 10a1 (card information 10b) by way of reading unit 2, memory unit 5 successively stores registered fingerprint information 10a1 (card information 10b) that has been read. Memory unit 5 has capacity to store a plurality of items of card information 10b. However, memory unit 5 does not have storage capacity for storing card information 10b of all cards 10 that are used by reading device 1.

For example, when a volatile storage element (memory) such as RAM is used as memory unit 5, all of card information 10b that has been stored in memory unit 5 is deleted when the power supply of memory unit 5 is cut off.

As a result, the use of volatile storage elements as memory unit 5 improves the security of card information 10b. In addition, a volatile storage element is normally capable of high-speed processing, and using a volatile storage element as memory unit 5 therefore enables high-speed processing.

Fingerprint scanner 6 is used as the acquisition unit and acquires the input identification information from the user. In the present embodiment, fingerprint scanner 6 acquires the user's fingerprint information as the input identification information. The user's fingerprint information is hereinbelow referred to as "input fingerprint information."

Fingerprint scanner 6 reads a fingerprint image, i.e., the input fingerprint information. Various types of fingerprint scanning methods have been proposed and put to practical use, and the method that is used in fingerprint scanner 6 is subject to no particular limitations. This method need only read a fingerprint image.

Fingerprint collation information generation unit (hereinbelow referred to as "generation unit") 7 converts the fingerprint image, i.e., the input fingerprint information that has been acquired by fingerprint scanner 6, to a format that can be used in collation. Generation unit 7 supplies this input fingerprint information, which has been converted, to card information selection unit (hereinbelow referred to as "selection unit") 8.

Upon receiving the input fingerprint information, selection unit 8 supplies this received input fingerprint information to fingerprint collation unit (hereinbelow referred to as "collation unit") 9. In addition, upon receiving input fingerprint information, selection unit 8 selects a plurality of registered fingerprint information 10a1, which have been stored in memory unit 5, starting in order with items having the highest priority.

Upon receiving input fingerprint information, collation unit 9 collates this input fingerprint information with registered fingerprint information 10a1 in the order of the selection by selection unit 8 and determines whether registered fingerprint information 10a1, which matches the input fingerprint information, is present among the plurality of items of registered fingerprint information 10a1.

When collation unit 9 determines that registered fingerprint information 10a1 that matches the input fingerprint information is present among the plurality of items of registered fingerprint information 10a1, collation unit 9 reports this finding to selection unit 8. Upon receiving this notification, selection unit 8 reads specific information 10a2 that is stored in memory unit 5 and is associated with registered fingerprint information 10a1 that matches the input fingerprint information. Selection unit 8 then reports this specific information 10a2 that has been read to the host device (for example, a control device such as a server).

With regard to the fingerprint collation method of collation unit 9, various methods exist such as a method for matching the image itself, a method that uses characteristic points of the fingerprint, or a method that uses spatial frequency of the image, and any of these methods may be used.

Selection unit 8 and collation unit 9 are included in collation/determination unit 11.

Thus, when fingerprint scanner 6 acquires the input fingerprint information, collation/determination unit 11 collates this input fingerprint information with a plurality of items of registered fingerprint information that are stored in memory unit 5 and determines whether registered fingerprint information, matching the input fingerprint information, is present within the plurality of items of registered fingerprint information.

When registered fingerprint information that matches the input fingerprint information is present among the plurality of items of registered fingerprint information, collation/determination unit 11 further supplies the specific information that has been stored in association with the registered fingerprint information in memory unit 5.

Figure 4:
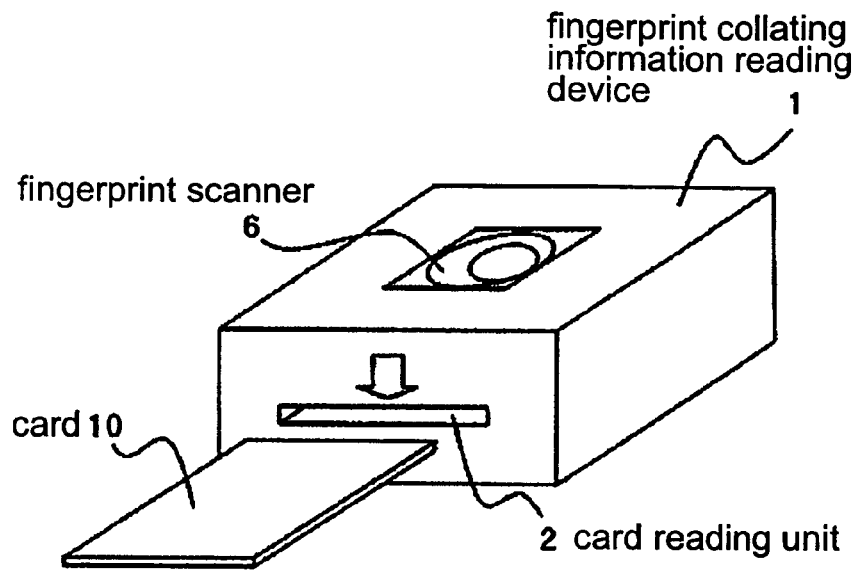
FIG. 4 is a schematic view showing the outer appearance of a fingerprint-collating information-reading device.

FIG. 4 is a schematic view showing the outer appearance of reading device 1. In FIG. 4, components that are identical to components shown in FIG. 1 are given the same reference numerals.

A summary of the operation is next described.

When a user sets card 10 in reading unit 2, reading unit 2 reads card information 10b from card 10. Reading unit 2 supplies this card information 10b to read-out unit 3. Read-out unit 3, upon receiving card information 10b, supplies this card information 10b to management unit 4.

Management unit 4 gives a high order of priority to card information 10b that has been newly read, and confers an order of priority to card information 10b according to the number matches in fingerprint collation. Management unit 4 stores card information 10b, which has been given an order of priority, in memory unit 5.

When the user next has his or her own fingerprint read by fingerprint scanner 6, fingerprint scanner 6 supplies the input fingerprint information that shows the read fingerprint to generation unit 7. Generation unit 7 converts the fingerprint information that has been inputted to input fingerprint information for collation. Generation unit 7 then provides this input fingerprint information that has been converted to selection unit 8.

Selection unit 8, upon receiving the input fingerprint information, supplies this input fingerprint information to collation unit 9. Selection unit 8 further selects a plurality of items of registered fingerprint information 10a1 that are stored in memory unit 5, starting in order with items having higher priority.

Upon receiving the input fingerprint information, collation unit 9 collates this input fingerprint information with registered fingerprint information 10a1 in the order of selection determined by selection unit 8, and thus determines whether registered fingerprint information 10a1, which matches the input fingerprint information, is present among the plurality of items of registered fingerprint information 10a1.

When registered fingerprint information 10a1, matching the input fingerprint information, is present among the plurality of items of registered fingerprint information 10a1, collation unit 9 reports this finding to selection unit 8.

Upon receiving this notification, selection unit 8 reads specific information 10a2 that has been stored in memory unit 5 in association with registered fingerprint information 10a1 that matches the input fingerprint information. Selection unit 8 reports this specific information 10a2 that has been read to the host device.

According to the present embodiment, memory unit 5, such as the cache memory of a CPU and which can store a plurality of items of card information 10b, is provided in reading device 1. Each time card 10 is set, card information 10b of that card 10 is stored in memory unit 5.

Input fingerprint information is collated with the registered fingerprint information of a plurality of items of card information 10b that have been stored. When there is registered fingerprint information that matches the input fingerprint information, card information 10b that is stored in memory unit 5 is used as the information of card 10 regardless of the presence or absence of card 10.

As a result, the time and effort that is required for resetting card 10 and reading card information 10b can be eliminated.

In addition, when input fingerprint information has been acquired, the input fingerprint information is collated with the plurality of items of registered fingerprint information that have been stored in memory unit 5. As a result, the user does not need to perform the troublesome tasks specifying the registered fingerprint information to be collated with the input fingerprint information.

In addition, priority is given to the plurality of items of card information in accordance with how recent the information may be, and in accordance with how many collation matches have occurred. As a result, the memory unit can be utilized more effectively, and the time that is required for collation can be reduced.

Explanation next regards operation.

The user sets card 10 in reading unit 2 and thus causes reading unit 2 to read card information 10b of card 10. The user then causes fingerprint scanner 6 to read his or her fingerprint. By means of these operations, the user supplies card information 10b of card 10 to reading device 1 and then performs operations such as logging in.

Figure 5:
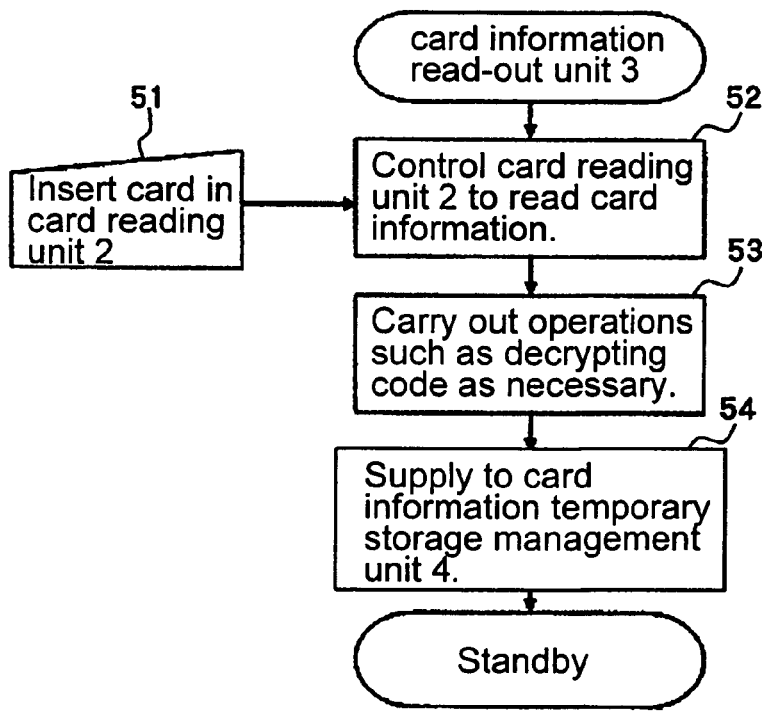
FIG. 5 is a flow chart explaining the operation of reading unit 3.

FIG. 5 is a flow chart for explaining the operations of read-out unit 3. Explanation next regards the operations of read-out unit 3 with reference to FIG. 5.

In Step 51, the user sets his or her own card 10 in reading unit 2.

Reading unit 2, upon detecting card 10, supplies a card detection signal to read-out unit 3. Upon receiving the card detection signal, read-out unit 3 executes Step 52.

In Step 52, read-out unit 3 causes reading unit 2 to read card information 10b (see FIG. 2) from card 10. Reading unit 2 supplies card information 10b that has been read to read-out unit 3. Upon receiving card information 10b from reading unit 2, read-out unit 3 executes Step 53.

In Step 53, if received card information 10b has been encrypted, read-out unit 3 decrypts this card information 10b. Upon completing Step 53, read-out unit 3 executes Step 54.

If card information 10b has not been encrypted, read-out unit 3 skips Step 53 after completing Step 52 and executes Step 54.

In Step 54, read-out unit 3 supplies card information 10b to management unit 4. Upon completing Step 54, read-out unit 3 enters a standby state.

Figure 6:
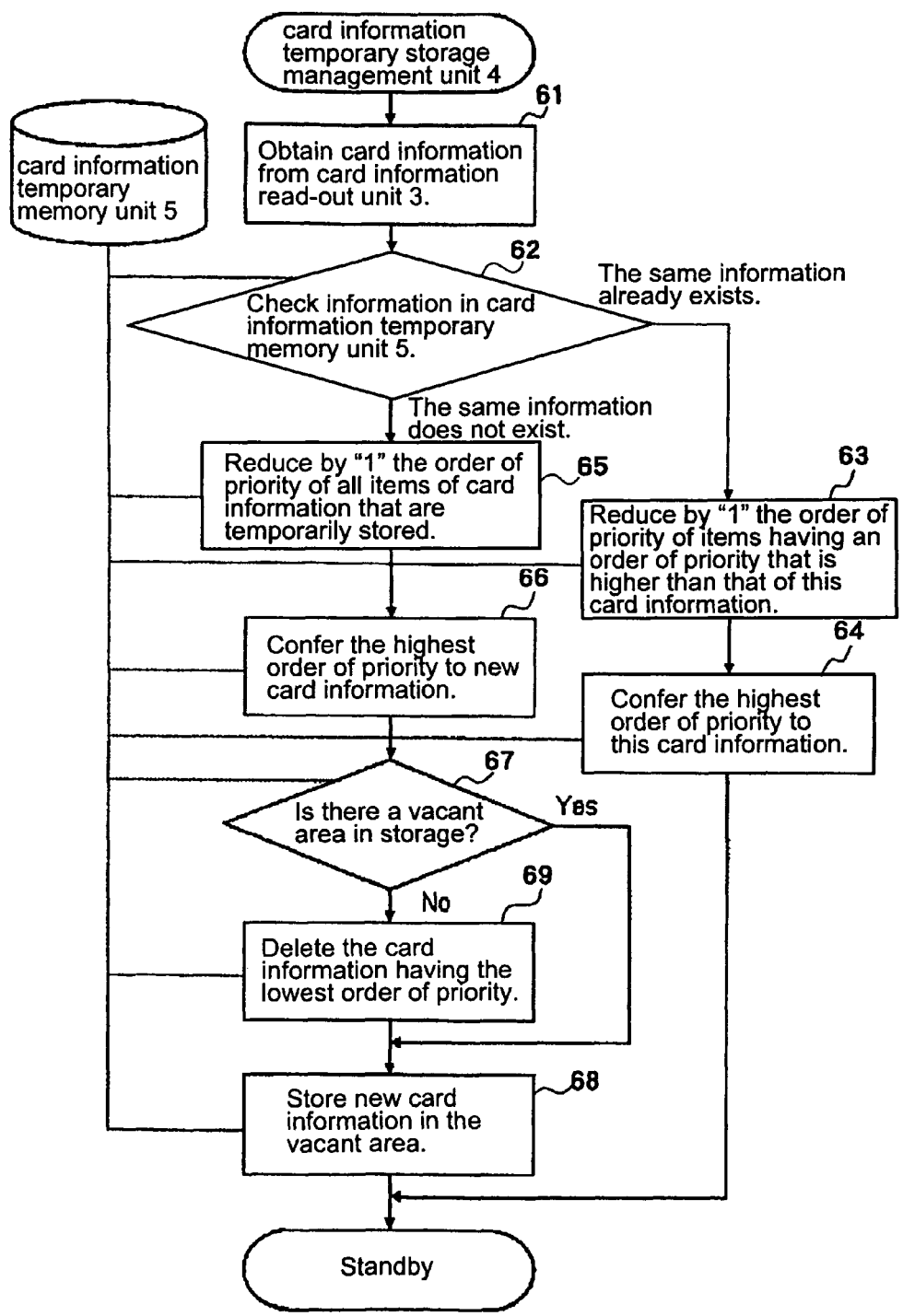
FIG. 6 is a flow chart explaining the operation of management unit 4.

FIG. 6 is a flow chart for explaining the operation of management unit 4. Explanation next regards the operation of management unit 4 with reference to FIG. 6.

In Step 61, management unit 4 receives card information 10b from read-out unit 3. Upon completing Step 61, management unit 4 executes Step 62.

In Step 62, management unit 4 verifies whether any of card information 10b is stored in memory unit 5. If any of card information 10b is already stored in memory unit 5, management unit 4 verifies whether card information 10b, which matches the newly obtained card information 10b, is stored in memory unit 5.

Figure 7:
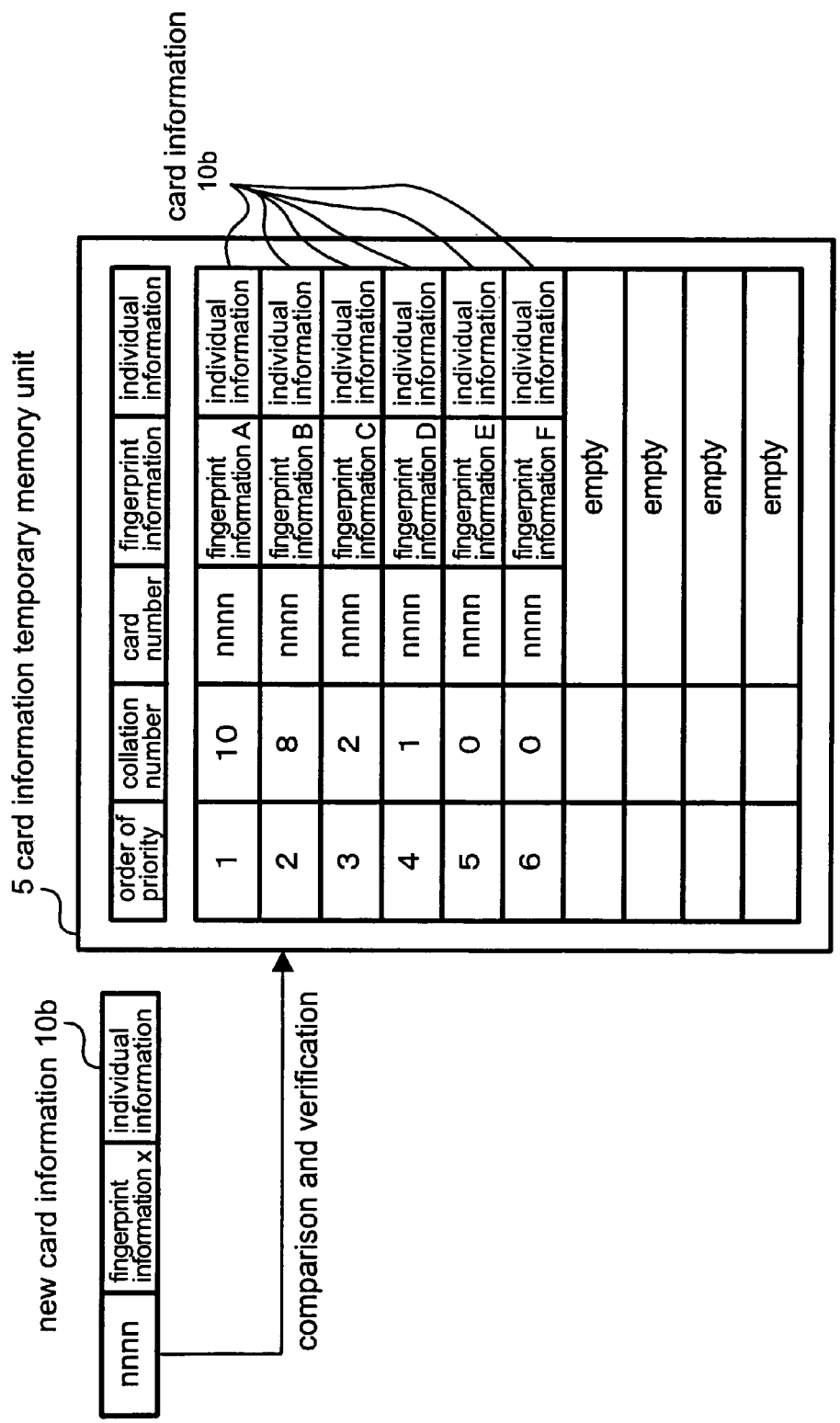
FIG. 7 is an explanatory view explaining the operation of management unit 4.

FIG. 7 is an explanatory view for explaining Step 62. Items in FIG. 7 that are the same as items shown in FIG. 2 and FIG. 3 are given the same reference numerals.

If card information 10b, which matches newly obtained card information 10b, is stored in memory unit 5, management unit 4 executes Step 63.

On the other hand, if card information 10b, which matches newly obtained card information 10b, is not stored in memory unit 5, management unit 4 executes Step 65.

In Step 63, management unit 4 reduces by 1 the orders of priority that are higher than the order of priority that has been conferred on card information 10b that matches newly obtained card information 10b. Upon completing Step 63, management unit 4 executes Step 64.

In Step 64, management unit 4 sets the order of priority, which is conferred on card information 10b that matches newly obtained card information 10b, to the highest rank.

Figure 8:
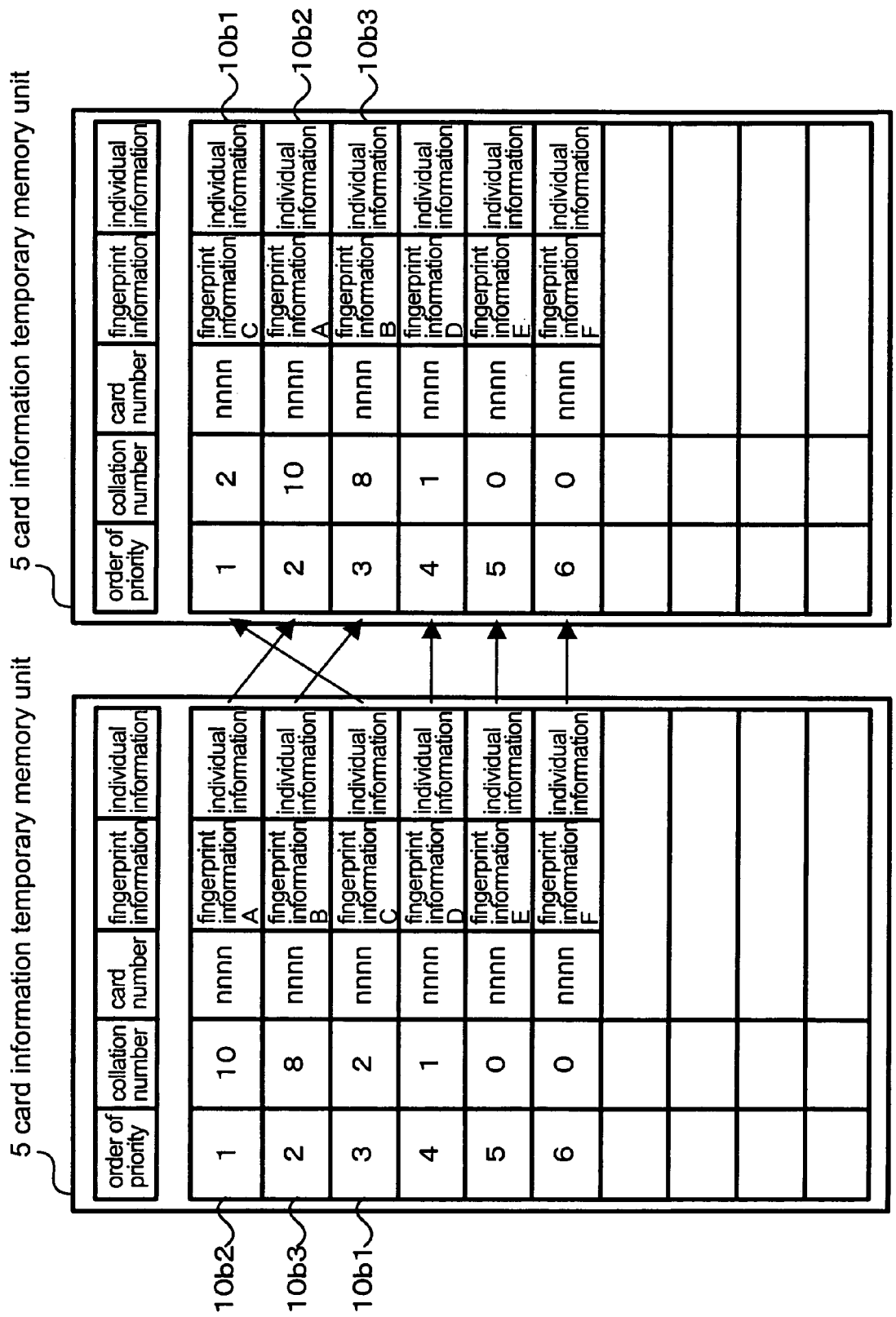
FIG. 8 is an explanatory view explaining the operation of management unit 4.

FIG. 8 is an explanatory view for explaining Steps 63 and 64. In addition, items in FIG. 8 that are the same as items shown in FIG. 3 are given the same reference numerals.

FIG. 8 shows operations when card information 10b1 matches newly obtained card information 10b. In this case, the order of priority of card information 10b becomes the highest rank, and moreover, the order of priority of card information 10b2 and 10b3 is reduced by "1."

In Step 65, on the other hand, management unit 4 reduces by "1" the order of priority of all items of card information 10b that have been temporarily stored in memory unit 5. Upon completing Step 65, management unit 4 executes Step 66.

In Step 66, management unit 4 sets newly obtained card information 10b to the highest priority. This is because the possibility of carrying out fingerprint collation using the newly obtained card information 10b immediately afterward is high. After completing Step 66, management unit 4 executes Step 67.

In Step 67, management unit verifies whether a vacant area (vacant capacity) is present for storing newly obtained card information 10b.

If this vacant area is present in memory unit 5, management unit 4 executes Step 68. On the other hand, if there is no vacant area in memory unit 5, management unit 4 executes Step 69.

In Step 68, management unit 4 stores newly obtained card information 10$b$ (card information 10$b$ is set to the highest priority) in the vacant area. Upon completing Step 68, management unit 4 enters the standby state.

Figure 9:
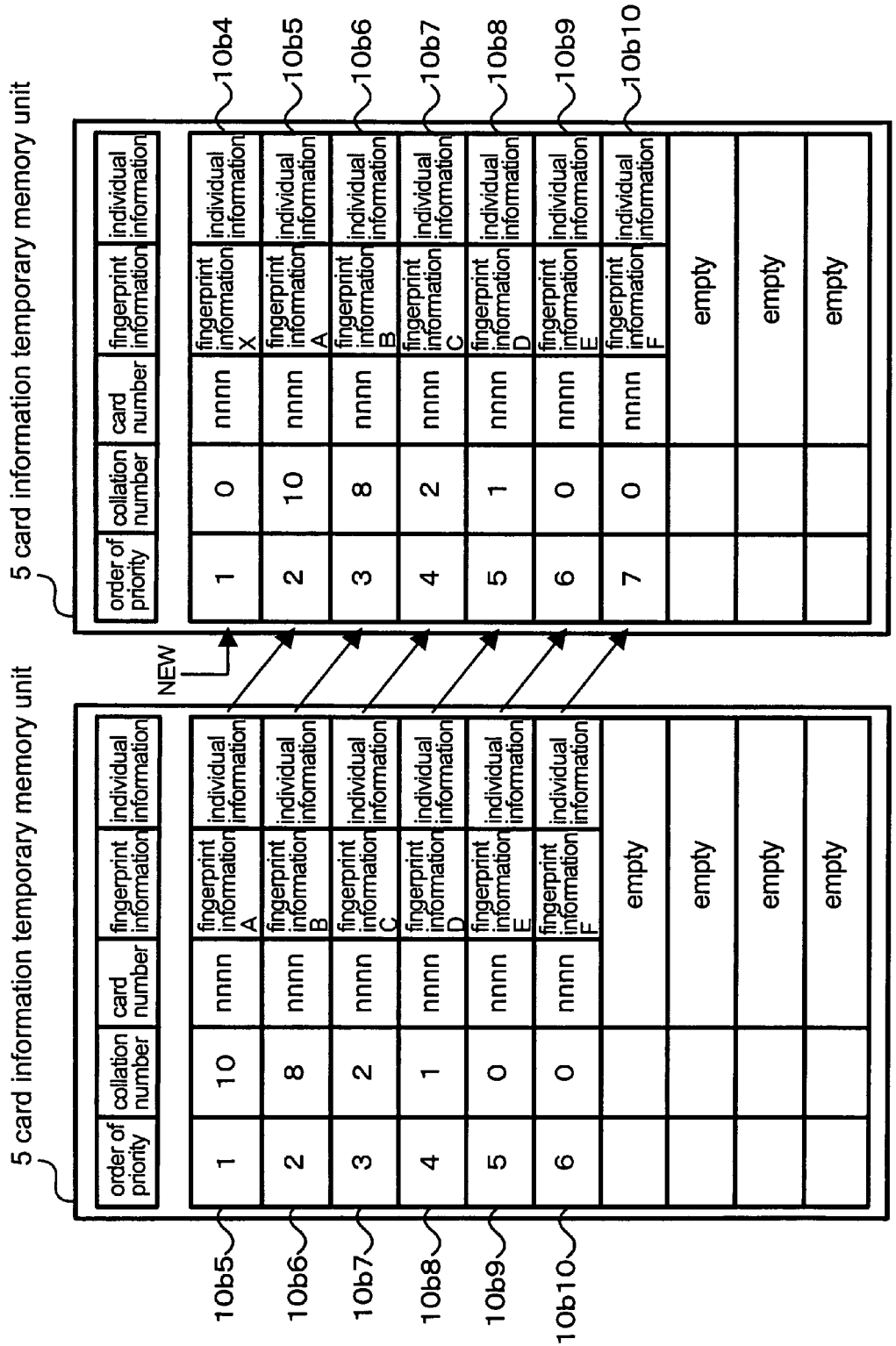
FIG. 9 is an explanatory view explaining the operation of management unit 4.

FIG. 9 is an explanatory view for explaining Steps 65, 66, 67, and 68. Items that are the same as items shown in FIG. 3 are given the same reference numerals.

In FIG. 9, newly obtained card information 10$b$4 becomes the highest priority, and the order of priority of the items from card information 10$b$5 to 10$b$10 is lowered by "1."

In Step 69, on the other hand, management unit 4 deletes card information 10$b$ that has the lowest order of priority from memory unit 5 in order to provide a vacant area. Upon completing Step 69, management unit 4 executes Step 68.

Figure 10:
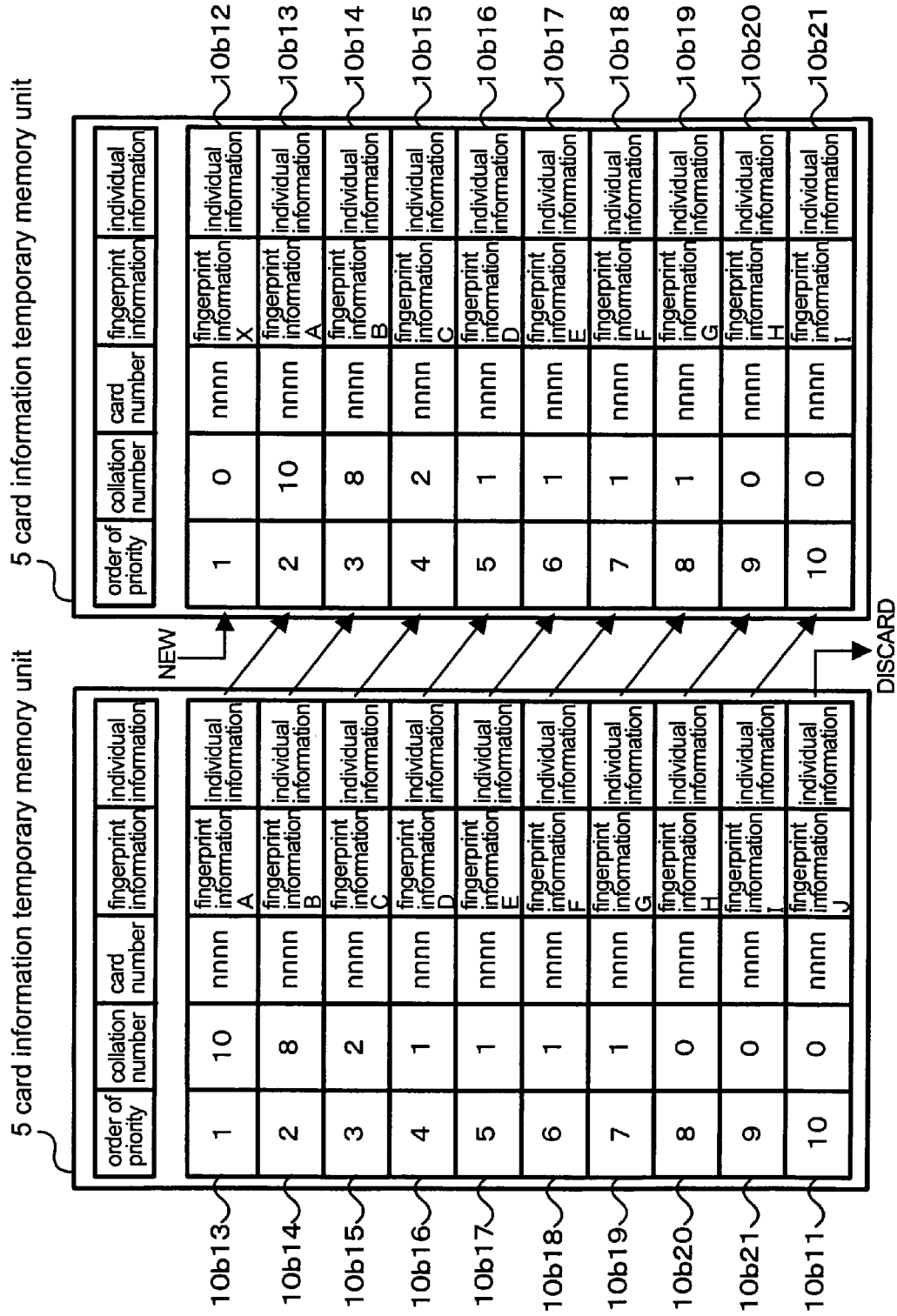
FIG. 10 is an explanatory view explaining the operation of management unit 4.

FIG. 10 is an explanatory view for explaining Steps 65, 66, 67, 69, and 68. Items in FIG. 10 that are the same as items shown in FIG. 3 are given the same reference numerals.

In FIG. 10, card information 10$b$11 that has the lowest order of priority is deleted. In addition, newly obtained card information 10$b$12 is set to the highest priority. Still further, the order of priority of the items from card information 10$b$13 to 10$b$21 is lowered by "1."

Subsequently, when new card information 10$b$ is read, the same operations as described above are executed without carrying out fingerprint collation. More specifically, card information 10$b$ is stored in memory unit 5 such that card information 10$b$ that has been read from card 10 has the highest order of priority.

Figure 11:
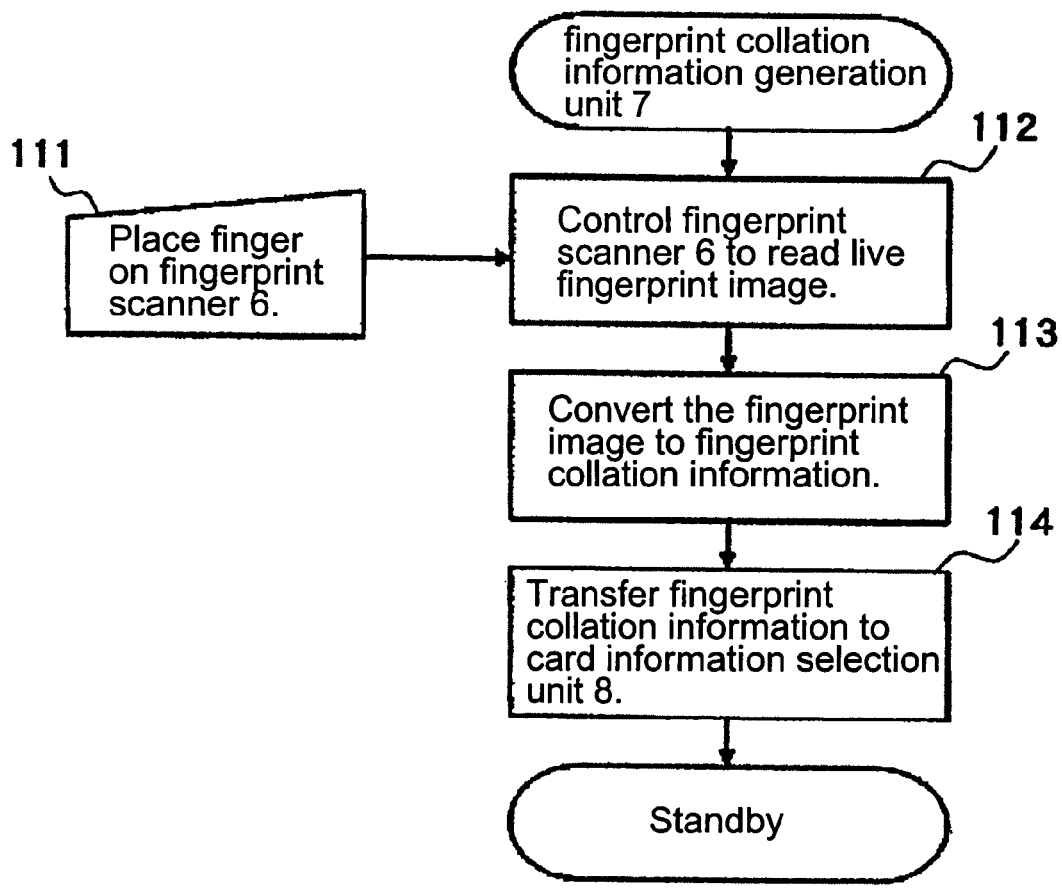
FIG. 11 is a flow chart explaining the operation of generation unit 7.

FIG. 11 is a flow chart for explaining the operation of generation unit 7. The following explanation regards the operation of generation unit 7 with reference to FIG. 11.

In Step 111, the user places his or her finger in fingerprint scanner 6.

Upon detecting a finger, fingerprint scanner 6 supplies a finger detection signal to generation unit 7. Upon receiving the finger detection signal, generation unit 7 executes Step 112.

In Step 112, generation unit 7 causes fingerprint scanner 6 to read the fingerprint. Fingerprint scanner 6 supplies a fingerprint image (input fingerprint information) that shows the fingerprint that has been read to generation unit 7. Upon receiving the fingerprint image from fingerprint scanner 6, generation unit 7 executes Step 113.

In Step 113, generation unit 7 converts the received fingerprint image to a format for collation, i.e., to fingerprint collation information. This fingerprint collation information is one example of input fingerprint information. Upon completing Step 113, generation unit 7 executes Step 114.

In Step 114, generation unit 7 supplies this fingerprint collation information to selection unit 8. Upon completing Step 114, generation unit 7 enters a standby state.

The processes from Step 111 to 114 may be carried out without relation to and parallel to the storage processes for storing card information 10$b$ in memory unit 5. Alternatively, the processes of Steps 111 to 114 may be carried out after completion of the storage processes for storing card information 10$b$.

Figure 12:
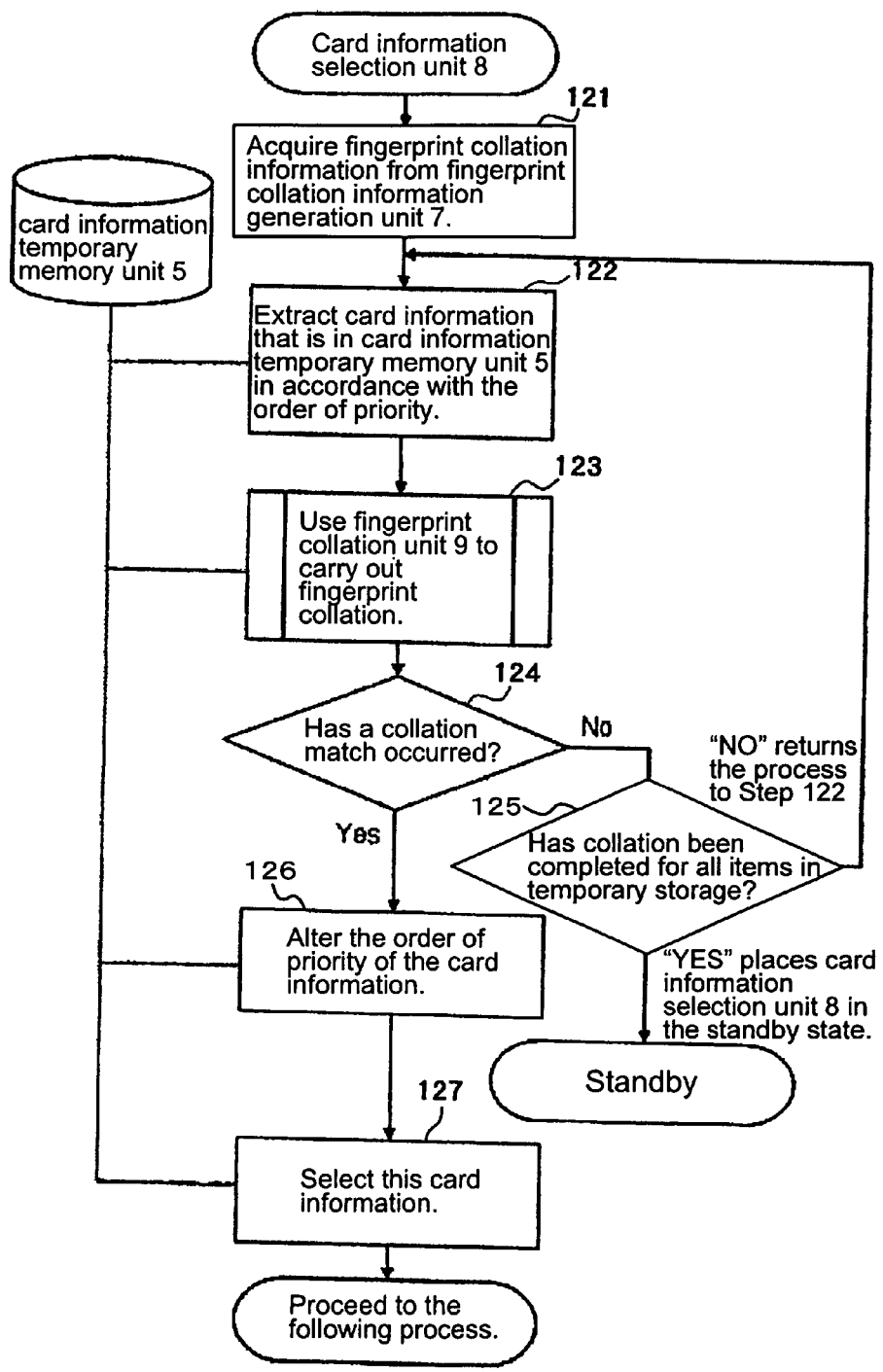
FIG. 12 is a flow chart explaining the operation of selection unit 8.

FIG. 12 is a flow chart for explaining the operation of selection unit 8. The following explanation relates to the operation of selection unit 8 with reference to FIG. 12.

In Step 121, selection unit 8 receives the fingerprint collation information from generation unit 7. Upon completing Step 121, selection unit 8 executes Step 122.

In Step 122, selection unit 8 selects from card information 10$b$ the item of card information not already selected and having the highest priority that is stored in memory unit 5. Upon completing Step 122, selection unit 8 executes Step 123.

In Step 123, selection unit 8 supplies fingerprint collation information having the highest priority to collation unit 9 and causes collation unit 9 to execute fingerprint collation.

Collation unit 9, upon receiving the fingerprint collation information, collates the received fingerprint collation information with registered fingerprint information 10$a$1 in card information 10$b$ that has been selected by selection unit 8. Collation unit 9 then reports the results of collation to selection unit 8. Upon receiving these collation results, selection unit 8 executes Step 124.

Selection unit 8 executes Step 125 when the collation results do not indicate any matching in Step 124, and executes Step 126 when the collation results indicate matching.

In Step 125, selection unit 8 determines whether the fingerprint collation information has been collated with all of card information 10$b$ that is stored in memory unit 5.

If the fingerprint collation information has not been collated with all items of card information 10$b$ that have been stored in memory unit 5, selection unit 8 executes Step 122. On the other hand, if the fingerprint collation information has been collated with all items of card information 10$b$ that have been stored in memory unit 5, selection unit 8 enters the standby state.

In Step 126 selection unit 8 reports card information 10$b$ that is currently selected to management unit 4. Based on card information 10$b$ that has been reported, management unit 4 alters the order of priority of card information 10$b$. For example, management unit 4 alters the order of priority of each item of card information 10$b$ such that items of card information having a greater number of collations are given a higher order of priority. Upon completing Step 126, selection unit 8 executes Step 127.

In Step 127, selection unit 8 reads specific information 10$a$2 from card information 10$b$ that is currently selected. Selection unit 8 reports specific information 10$a$2 that has been read to the host device (for example, to a control device such as a server).

Figure 13:
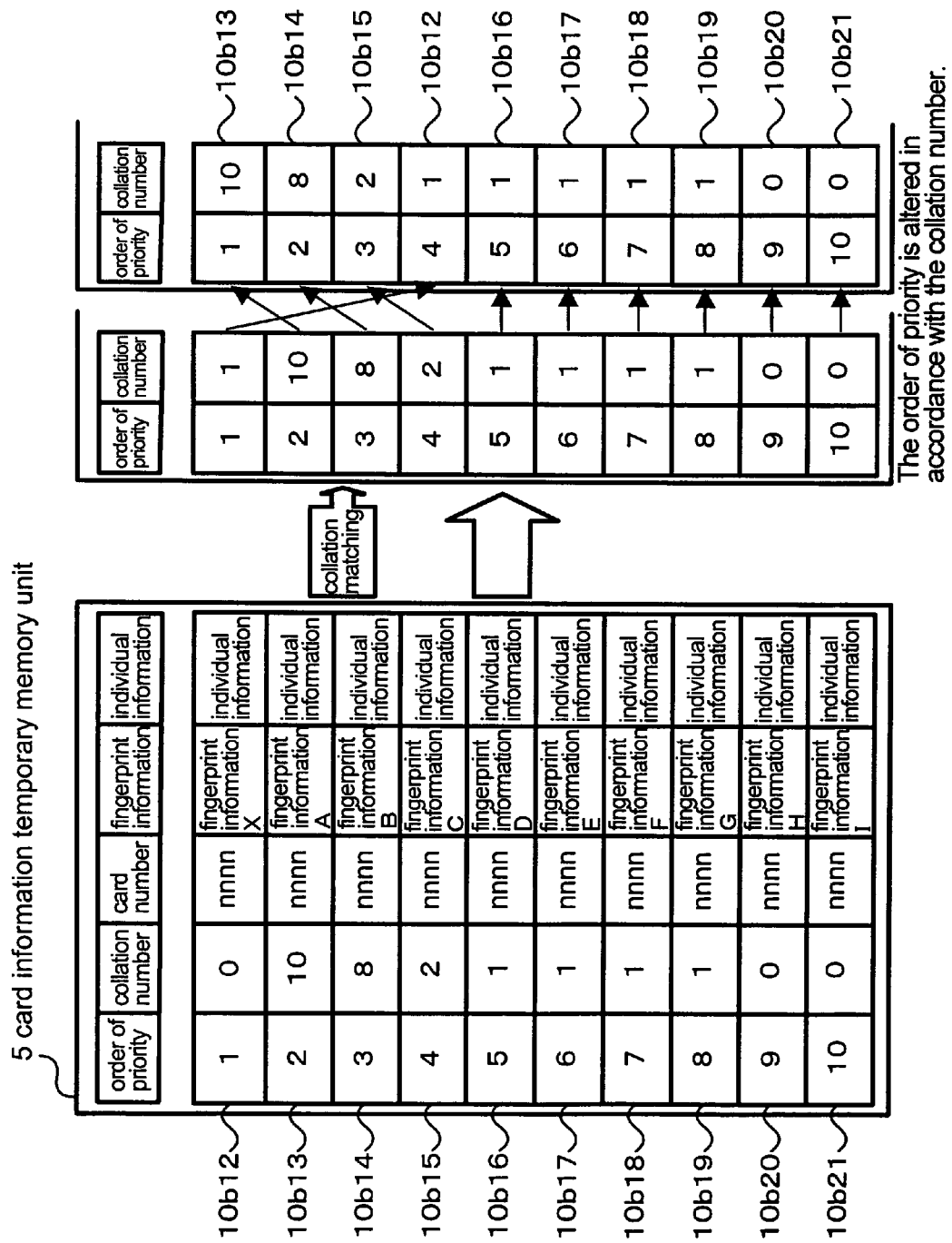
FIG. 13 is an explanatory view explaining the operation of selection unit 8.

FIG. 13 is an explanatory view for explaining Step 126. Items in FIG. 13 that are identical to items shown in FIG. 10 are given the same reference numerals. In addition, FIG. 13 shows the operation for altering the order of priority when the fingerprint collation information matches card information 10$b$12.

In this case, management unit 4 alters the collation number of card information 10$b$12 to "1." Management unit 4 then alters the order of priority of card information 10$b$13 to "1," alters the order of priority of card information 10$b$14 to "2", alters the order of priority of card information 10$b$15 to "3", and alters the order of priority of card information 10$b$12 to "4" such that the order of priority is higher for items of card information having a greater number of collations.

When the order of priority of card information is determined according to the number of collations that match, the order of priority of the items of card information having collations that match may be set to the highest rank. In any case, since the number of collation that matches is the basis for determining the order of priority, candidates (registered fingerprint information) having a greater likelihood of matching when carrying out subsequent collation are selected first.

According to the present embodiment, when users repeatedly use a collation device (for example, a card reading device with recorded information and fingerprint authentication capability) while exchanging in short time intervals a plurality, but not a great number of cards, the following effects are exhibited:

The inconvenience to users of resetting cards can be eliminated, and the time for re-reading card information from cards can also be eliminated. An improvement in operation efficiency can thus be obtained.

In addition, if volatile memory is used for memory unit 5, card information that is stored in memory unit 5 is eliminated simultaneously with the cutoff of the power supply of memory unit 5, whereby an improvement of the security of card information can be obtained.

In addition, in the present embodiment, each time registered fingerprint information is read from card 10, this registered fingerprint information is successively stored in memory unit 5. When input fingerprint information is received from a user, this input fingerprint information is collated with the plurality of items of registered fingerprint information that have been stored in memory unit 5 in order to determine if registered fingerprint information, matching the input fingerprint information, is present among the plurality of items of registered fingerprint information.

As a result, by storing the registered fingerprint information in memory unit 5, it can be determined whether registered fingerprint information, matching the input fingerprint information, is present among the plurality of items of registered fingerprint information without the user having to use card 10 and without the user having to perform operations specifying the registered fingerprint information that is stored in memory unit 5.

Accordingly, in a collation device that collates registered fingerprint information, which has been recorded on a portable recording medium such as a card, with input fingerprint information that has been acquired from a user, the time that is required for collation can be shortened.

In the present embodiment, moreover, reading unit 2 reads registered fingerprint information and specific information that have been recorded on card 10. Further, each time reading unit 2 reads registered fingerprint information and specific information, memory unit 5 successively stores this registered fingerprint information and specific information that have been read and that are associated with each other. When registered fingerprint information, matching the input fingerprint information, is present among the plurality of items of registered fingerprint information, collation/determination unit 11 supplies the specific information that has been stored in memory unit 5 and that is associated with the registered the fingerprint information. In this case, the time that is required for collation can be shortened, and the specific information can therefore be supplied in a shorter time interval.

In the present embodiment, moreover, management unit 4 gives an order of priority to registered fingerprint information that has been read by reading unit 2. The registered fingerprint information that has been given an order of priority is successively stored in memory unit 5. Selection unit 8 selects a plurality of items of registered fingerprint information that are stored in memory unit 5 starting in order with items having higher priority. When fingerprint scanner 6 acquires input fingerprint information, collation unit 9 collates this input fingerprint information with the registered fingerprint information based on the order of selection determined by selection unit 8 and determines whether registered fingerprint information, matching the input fingerprint information, is present among the plurality of items of registered fingerprint information.

In this case, the registered fingerprint information is collated with the input fingerprint information in sequence based on the priority of the registered fingerprint information. As a result, appropriate setting of the order of priority enables faster determination of the existence of registered fingerprint information that matches the input fingerprint information.

In the present embodiment, moreover, management unit 4 gives the highest order of priority to registered fingerprint information that has been newly read by reading unit 2. In this case, the highest order of priority can be given to registered fingerprint information that is most likely to be used for collation. As a result, determination of the existence of registered fingerprint information that matches input fingerprint information can be realized quickly.

In the present embodiment, moreover, when collation unit 9 determines that registered fingerprint information, matching input fingerprint information, is present among the plurality of items of registered fingerprint information, management unit 4 determines the order of priority of the registered fingerprint information in accordance with the times that the registered fingerprint information matches the input fingerprint information. In this case, the order of priority of registered fingerprint information having a high frequency of use for collation can be raised, whereby determination of the existence of registered fingerprint information that matches input fingerprint information can be realized quickly.

In the present embodiment, moreover, when reading unit 2 newly reads registered fingerprint information and there is no capacity in memory unit 5 for storing this registered fingerprint information, management unit 4 deletes the registered fingerprint information that has the lowest order of priority from memory unit 5 and then stores the registered fingerprint information that has been read to memory unit 5. In this case, registered fingerprint information that has a high order of priority remains in memory unit 5, whereby the limited capacity of memory unit 5 can be more effectively used.

In the embodiment as described in the foregoing explanation, the configuration shown in the figures is only one example and does not in any way limit the configuration of the present invention.

For example, identification information is open to appropriate modifications and is not limited to fingerprint information. As an example, the identification information may be a password.

While preferred embodiments of the present invention have been described using specific terms, such description is for illustrative purposes only, and it is to be understood that changes and variations may be made without departing from the spirit or scope of the following claims.

What is claimed is:

1. A collation device comprising:
   a reading unit for reading registered identification information and specific information that are recorded on a portable recording medium;
   a storage unit for, each time said reading unit reads said registered identification information and said specific information, successively storing said registered identification information and said specific information that have been read in association with each other so that said registered identification information and said specific information can be distinguished registered identification information and specific information that are already stored in said storage unit, such that said storage unit stores a plurality of items of registered identification information and specific information;
   an acquisition unit for acquiring input identification information from a user;
   a collation/determination unit for, when said acquisition unit acquires said input identification information without said reading unit reading said registered identification information and specific information, collating the input identification information with the plurality of items of registered identification information that are stored in said storage unit, determining whether registered identification information that matches said input identification information is present among said plurality of items of registered identification information, and supplying the specific information that has been stored in said storage unit in association with the registered identification information when registered identification information matching said input identification information is present among said plurality of items of registered identification information; and a storage management unit for assigning an order of priority to registered identification information that has been read by said reading unit and successively storing the registered identification information to which an order of priority has been given in said storage unit;

wherein said collation/determination unit comprises:

a selection unit for, when said acquisition unit acquires said input identification information, selecting a plurality of items of registered identification information that have been stored in said storage unit starting in order with items having the highest order of priority; and a collation unit for collating said input identification information with said registered identification information in the order that has been selected by said selection unit and determining whether registered identification information that matches said input identification information is present among said plurality of items of registered identification information.

2. The collation device according to claim 1, wherein said storage management unit gives the highest order of priority to registered identification information that has been newly read by said reading unit.

3. The collation device according to claim 1, wherein, when said collation unit has determined that registered identification information that matches said input identification information is present among said plurality of items of registered identification information, said storage management unit determines the order of priority of registered identification information in accordance with the times that the registered identification information matches the input identification information.

4. The collation device according to claim 1, wherein, when said reading unit newly reads said registered identification information and when capacity for storing this registered identification information that has been read is not available in said storage unit, said storage management unit deletes registered identification information having the lowest order of priority from said storage unit and stores the registered identification information that has been newly read in said storage unit.

5. The collation device according to claim 1, wherein said portable recording medium is a card-type.

6. The collation device according to claim 1, wherein said storage unit is volatile memory.

7. The collation device according to claim 6, wherein said volatile memory is RAM.

8. The collation device according to claim 1, wherein said registered identification information is registered fingerprint information, and said input identification information is input fingerprint information.

9. A collation method that is performed in a collation device that collates registered identification information that has been recorded on a portable recording medium with input identification information that has been inputted from a user and that has a storage unit for storing said registered identification information; said collation method comprising:

using a processor of the collation device to carry out the steps of:

a reading step for reading registered identification information and specific information that have been recorded on said portable recording medium;

a storing step for, each time said registered identification information and said specific information of said portable recording medium are read, successively storing said registered identification information and said specific information that have been read in association with each other in said storage unit so that said registered identification information and said specific information can be distinguished registered identification information and specific information that are already stored in said storage unit, such that said storage unit stores a plurality of items of registered identification information and specific information;

an acquisition step for acquiring said input identification information from said user;

a collation/determination step for, when said input identification information is acquired without reading said registered identification information and specific information, collating the input identification information with the plurality of items of registered identification information that have been stored in said storage unit, determining whether registered identification information that matches said input identification information is present among said plurality of items of registered identification information, and supplying the specific information that has been stored in said storage unit in association with the registered identification information when registered identification information matching said input identification information is present among said plurality of items of registered identification information; and an assigning step for assigning an order of priority to said registered identification information;

wherein:

said storing step includes successively storing in said storage unit registered identification information to which said order of priority has been given; and said collation/determination step includes:

a selection step for, when said input identification information is acquired, selecting a plurality of items of registered identification information that are stored in said storage unit starting in order with items having the highest order of priority; and a collation step for collating said input identification information with said registered identification information in the order of selection determined in said selection step and determining whether registered identification information that matches said input identification information is present among said plurality of items of registered identification information.

10. The collation method according to claim 9, wherein said assigning step includes assigning the highest order of priority to registered identification information that has been newly read in said reading step.

11. The collation method according to claim 9, wherein said assigning step includes, when registered identification information that matches said input identification information is determined to be present among said plurality of items of registered identification information in said collation step, determining the order of priority of the registered identification information according to the times that the registered identification information matches the input identification information.

12. The collation method according to claim 9, wherein said storage step includes, when registered identification information is newly read in said reading step and when capacity is not available in said storage unit for storing the registered identification information that has been read, deleting registered identification information that has the lowest order of priority from said storage unit and then storing the registered identification information that has been read in said storage unit.

13. The collation method according to claim 9, wherein said portable recording medium is a card-type recording medium.

14. The collation method according to claim 9, wherein said storage unit is volatile memory.

15. The collation method according to claim 14, wherein said volatile memory is RAM.

16. The collation method according to claim 9, wherein said registered identification information is registered fingerprint information, and said input identification information is input fingerprint information.

* * * * *